United States Patent
Dittenhofer

(10) Patent No.: US 6,357,921 B1
(45) Date of Patent: Mar. 19, 2002

(54) RADIAL-AXIAL BEARING ASSEMBLY

(75) Inventor: Thomas Dittenhofer, Riedbach (DE)

(73) Assignee: Ina Walzlager Schaeffler oHG (DE)

( * ) Notice: Subject to any disclaimer, the term of this patent is extended or adjusted under 35 U.S.C. 154(b) by 1 days.

(21) Appl. No.: 09/644,014

(22) Filed: Aug. 22, 2000

(30) Foreign Application Priority Data

Sep. 9, 1999 (DE) .......................................... 199 42 984

(51) Int. Cl.⁷ .............................................. F16C 19/38
(52) U.S. Cl. ...................................................... 384/455
(58) Field of Search ................................ 384/455, 600, 384/452, 453, 454

(56) References Cited

U.S. PATENT DOCUMENTS

| 1,098,149 A | 5/1914 | Hani |
| 3,403,949 A | 10/1968 | Leissner |

FOREIGN PATENT DOCUMENTS

| DE | 1037775 | 8/1958 |
| DE | 1910796 | 10/1964 |
| DE | 2917425 | 11/1980 |
| DE | 4115217 | 11/1992 |
| DE | 9214796 | 2/1993 |

Primary Examiner—Lenard A. Footland
(74) Attorney, Agent, or Firm—Bierman, Muserlian and Lucas

(57) ABSTRACT

A radial-axial bearing assembly made up of a radial cylinder roller bearing (1) and a thrust cylinder roller bearing (2) characterized in that a radially inwards directed flange (10) of an outer ring (3) of the radial cylinder roller bearing (1) is arranged between the radial cylinder roller bearing (1) and the thrust cylinder roller bearing (2) and thus defines a first raceway (19) for the thrust cylinder roller bearing (2), a first bearing washer (16) is arranged between two cylinder roller crown rings (12, 13) of the thrust cylinder roller bearing (2) and defines a second and a third raceway (20, 21) for the thrust cylinder roller bearing (2) while a second bearing washer (17) defines a fourth raceway (22) therefor, said second bearing washer (17) being connected to the outer ring (3) of the radial cylinder roller bearing (1) by fixing screws (18) whereby a self-retaining combined radial-axial bearing is formed whose pre-stress can be adjusted by the manufacturer through the axial dimension of the first bearing washer (16).

10 Claims, 2 Drawing Sheets

RADIAL-AXIAL BEARING ASSEMBLY

FIELD OF THE INVENTION

The invention concerns a radial-axial bearing assembly comprising a radial cylinder roller bearing for supporting radial forces, an outer ring of said radial cylinder roller bearing having a radially inwards directed flange, said radial-axial bearing assembly further comprising a double-direction thrust cylinder roller bearing having raceways formed by a first and a second bearing washer and by said radially inwards directed flange, the first bearing washer being arranged directly adjacent an end face of an inner ring of said radial cylinder roller bearing, and means being provided for eliminating play in the thrust cylinder roller bearing.

BACKGROUND OF THE INVENTION

A radial-axial rolling bearing of the pre-cited type is known from DE 10 37 775. This combined bearing is intended mainly for the mounting of spindles of machine tools and comprises a double-row cylinder roller bearing for supporting radial forces. The inner ring of this bearing is made with two outer flanges and one central flange. The outer ring of this double-row cylinder roller bearing has an S-shaped configuration, i.e. it has a radially outwards directed flange at one end and a radially inwards directed flange at the other end. The outwards directed flange serves to fix the bearing on a connecting structure. The radially inwards directed flange of the S-shaped outer ring forms the two inner raceways for a double-direction thrust cylinder roller bearing whose outer raceways are formed by two bearing washers. The thrust cylinder roller bearing is pre-stressed by a nut which is placed around the shaft and acts through an intermediate ring.

The main drawback of such a bearing structure is that the elimination of play and the adjustment of pre-stress in the bearing has to be performed by the customer himself with the help of the locknut. If the pre-stress is too high, the bearing can run hot. In the case of an insufficient pre-stress, on the other hand, there is the danger of the inappropriately mounted component impairing the operation of an entire machine. A further drawback of this radial-axial bearing is that additional parts are required for pre-stressing the bearing which means that the locknut and the intermediate ring have to be additionally manufactured. Besides this, the locknut makes it necessary to provide an outer thread in an appropriate region of the shaft to be mounted. It is also possible that additional manufacturing inexactitudes be introduced into the overall structure due to skewing of these components, i.e. the locknut and the intermediate ring. A further drawback, finally, is that due to its S-shape, the outer ring of the radial cylinder roller bearing is very complicated and expensive to manufacture. The same applies to the inner ring of the radial cylinder roller bearing due to its three flanges. Because of all the above-mentioned drawbacks, the manufacture and handling of such a bearing structure is extremely complicated.

OBJECTS OF THE INVENTION

It is an object of the invention to provide a combined radial-axial rolling bearing which is easier to manufacture and very much simpler for handling by the customer.

This and other objects and advantages of the invention will become obvious from the following detailed description.

SUMMARY OF THE INVENTION

The invention achieves the above objects by the fact that the flange is arranged between the radial cylinder roller bearing and the thrust cylinder roller bearing and thus defines a first raceway for the thrust cylinder roller bearing, the first bearing washer is arranged between two cylinder roller crown rings of the thrust cylinder roller bearing and defines a second and a third raceway for the thrust cylinder roller bearing while the second bearing washer defines a fourth raceway therefor, said second bearing washer being connected to the outer ring of the radial cylinder roller bearing by fixing screws, and a freedom from play in the thrust cylinder roller bearing is effected by the axial dimension of the first bearing washer.

The decisive advantage of the inventive structure is that, due to the connection of the second bearing washer to the outer ring of the radial cylinder roller bearing, the pre-stress of the bearing assembly can be adjusted by the manufacturer. This simplifies handling of such a combined radial-axial bearing for the customer and avoids defects in the bearing that can be caused by an improper adjustment of the pre-stress by the customer. Besides this, such a bearing can be manufactured much more economically because an additional device in the form of a locknut for adjusting the bearing pre-stress and a force-transmitting intermediate ring are no longer required. Moreover, the precision of manufacturing of the bearing assembly as a whole is also improved by the omission of these components because shape defects of the locknut and the intermediate ring (skewed position) are no longer introduced into the overall bearing structure. A further advantage is that the simple shape of the inner and outer rings of the radial cylinder roller bearing results in a much more economic production of the radial cylinder roller bearing so that the cost of production of the entire bearing structure is further reduced.

In a preferred advantageous embodiment of the invention, the inner ring of the radial cylinder roller bearing comprises a rim that is arranged in the vicinity of the flange of the outer ring and oriented in a direction opposite to the flange. This rim assures that the inner ring cannot be pulled out of the bearing arrangement, i.e. a self-retaining assembled unit is created.

According to a further feature of the invention, the inner ring and the first bearing washer are made integrally with each other. This reduces the total number of components of the bearing arrangement and simplifies the assembly of the entire bearing structure.

According to still another feature of the invention, the second bearing washer projects radially outwardly beyond the outer ring and comprises bores in this projecting region for fixing the bearing assembly on a connecting structure.

For a better seating of the entire bearing assembly in a connecting structure, at least a part of the outer peripheral surface of the outer ring is configured as a cylindrical centering surface for concentrically guiding the bearing in a corresponding bore of the connecting structure.

According to still another feature of the invention, a seal is arranged between the outer and the inner ring of the radial cylinder roller bearing. Further features of the invention concern the lubrication of the combined radial-axial bearing. The outer ring comprises an axial lubricant supply bore which communicates with a radial lubricant supply bore. The second bearing washer likewise comprises an axial and a radial lubricant supply bore. Still other features of the invention concern the configuration of the radial-axial bearing assembly with lubricant discharge bores. According to a final feature of the invention, the claimed bearing is used for mounting master cylinders in printing presses.

BRIEF DESCRIPTION OF THE DRAWINGS

The invention will now be described more closely with reference to the figures of the appended drawings.

DETAILED DESCRIPTION OF THE DRAWINGS

Figure 1:
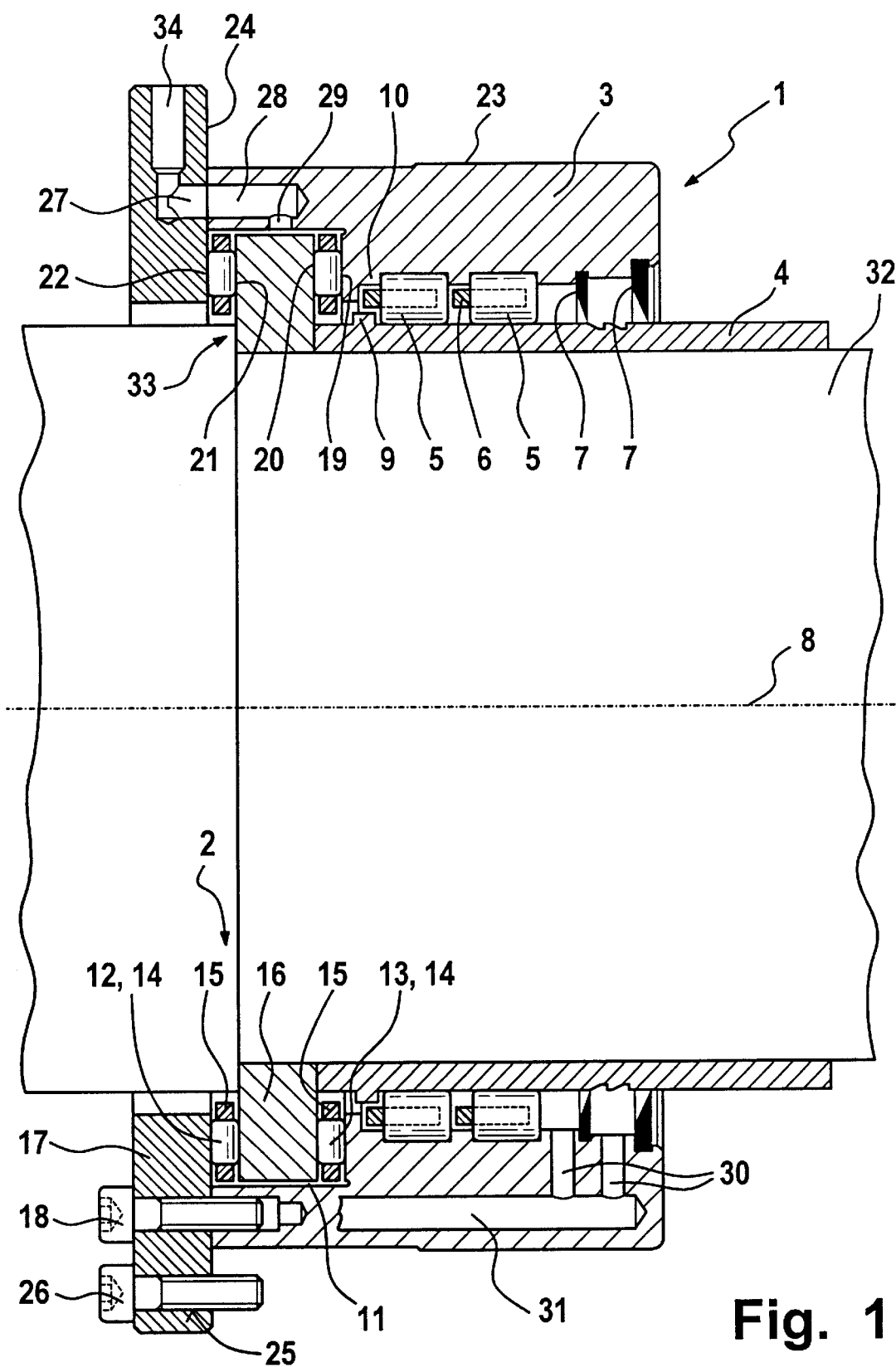
FIG. 1 shows a longitudinal cross-section through a radial-axial bearing assembly of the invention.
Figure 2:
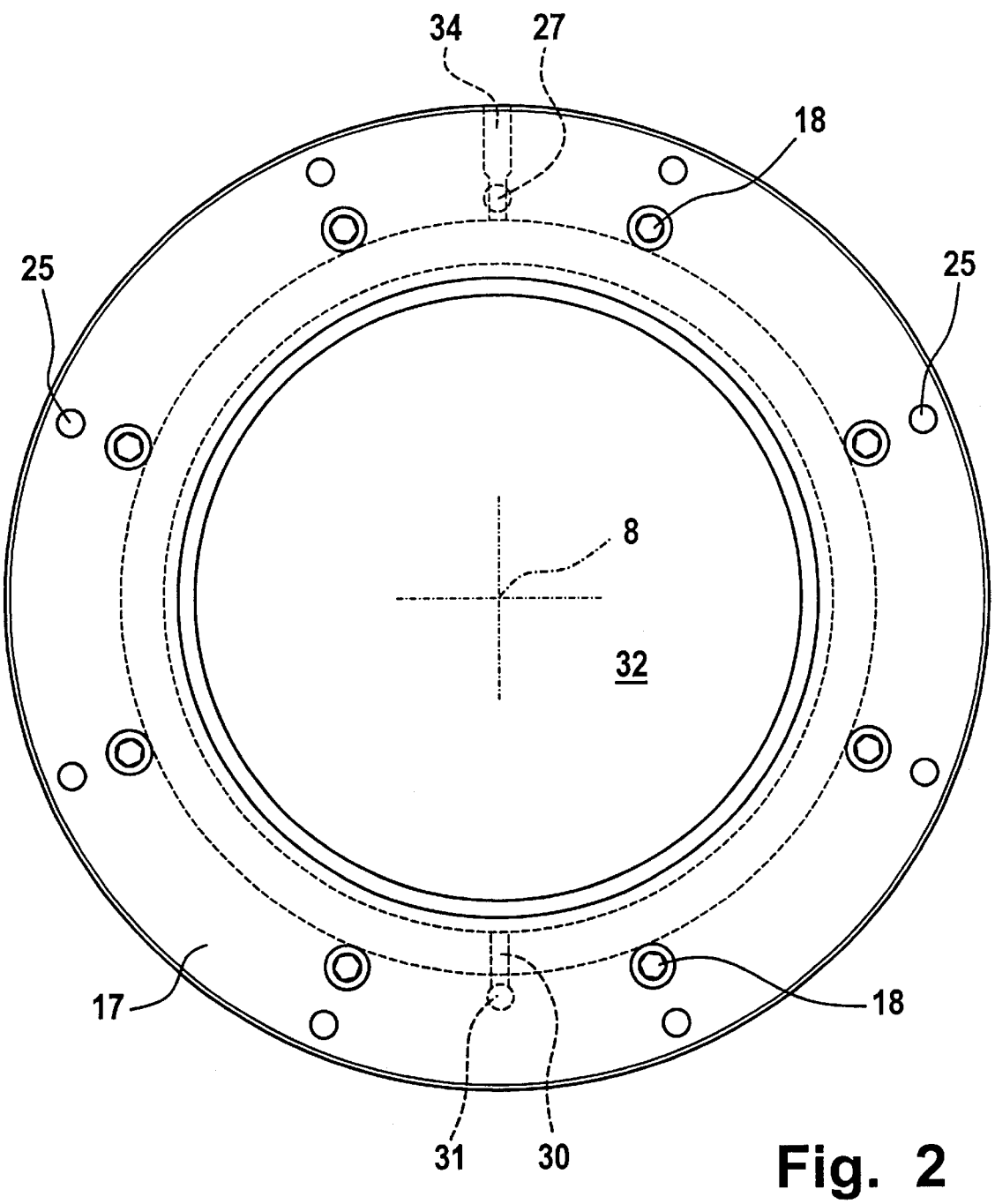
FIG. 2 is a side view of the bearing assembly of FIG. 1.

The radial-axial rolling bearing of the invention shown in FIGS. 1 and 2 comprises a two-row radial cylinder roller bearing 1 (that may, however, also comprise only one row of cylinder rollers) and a double-direction thrust cylinder roller bearing 2. A shaft 32 is mounted by a shoulder 33 for rotation about its axis 8 in the bearing. The radial cylinder roller bearing 1 comprises the outer ring 3 that supports radial forces and one-sided axial forces as well as tilting moments. The radial bearing 1 further comprises the inner ring 4 and cylinder rollers 5 guided in the cage 6 that are in rolling contact with raceways, not referenced. The radial cylinder roller bearing 1 is protected from the outside by seals 7 disposed between the outer ring 3 and the inner ring 4. The inner ring 4 comprises the radially outwards directed rim 9 that is arranged in the vicinity of the radially inwards directed flange 10 of the outer ring 3. The thrust cylinder roller bearing 2 with its two cylinder roller crown rings 12 and 13 is arranged in a recess 11 defined in axial direction in the outer ring 3 by the flange 10. The cylinder rollers 14 of this bearing 2 are guided in cages 15. The first bearing washer 16 (shaft washer), which abuts the shoulder 33 of the shaft 32, is disposed between the two cylinder roller crown rings 12 and 13, while the second bearing washer 17 (housing washer) is connected by fixing screws 18 to the outer ring 3 of the radial cylinder roller bearing 1. In this way, four raceways are created for the double-direction thrust cylinder roller bearing 2, the first 19 of these raceways being formed on the flange 10 of the outer ring 3, while the second and the third raceways 20 and 21 are provided by the first bearing washer 16, and the fourth raceway 22 is defined on the second bearing washer 17. The second bearing washer 17 projects beyond the outer ring 3 in radial direction and in this region, it comprises bores 25 into which fixing screws 26 are inserted that connect the entire bearing assembly to a connecting structure, not shown. To assure a very precise seating of the bearing of the invention in the connecting structure, the outer ring 3 is configured with a centering surface 23. This centering surface 23 extends over a part of the outer peripheral surface of the outer ring 3 and assures a concentric seating of the bearing in a corresponding bore of the connecting structure. The second bearing washer 17 bears with a part of its end face 24 against the wall of the connecting structure.

As can be seen further in the figures, both the second bearing washer 17 and the outer ring 3 comprise axial 27, 28 and radial lubricant supply bores 34, 29. These lubricant supply bores 34, 27, 28 and 29 are connected to one another so that lubricant can be introduced from the outside into the recess 11 and is distributed from there uniformly through both bearings 2, 1 by rotation. From the lower half of FIG. 1 and from FIG. 2 it can be seen that both the outer ring 3 and the second bearing washer 17 are provided with radial 30 and axial lubricant discharge bores 31 for leading off used lubricant.

What is claimed is:

1. A radial-axial bearing assembly comprising a radial cylinder roller bearing for supporting radial forces, an outer ring of said radial cylinder roller bearing having a radially inwards directed flange, said radial-axial bearing assembly further comprising a double-direction thrust cylinder roller bearing having raceways formed by a first and a second bearing washer and by said radially inwards directed flange, the first bearing washer being arranged directly adjacent an end face of an inner ring of said radial cylinder roller bearing, and means being provided for eliminating play in the thrust cylinder roller bearing, wherein said flange is arranged between the radial cylinder roller bearing and the thrust cylinder roller bearing and thus defines a first raceway for the thrust cylinder roller bearing, the first bearing washer is arranged between two cylinder roller crown rings of the thrust cylinder roller bearing and thus defines a second and a third raceway for the thrust cylinder roller bearing while the second bearing washer defines a fourth raceway therefor, said second bearing washer being connected to the outer ring of the radial cylinder roller bearing by fixing screws, and a freedom from play in the thrust cylinder roller bearing is effected by an axial dimension of the first bearing washer.

2. A radial-axial bearing assembly of claim 1 wherein the inner ring comprises a rim that is arranged in a vicinity of the flange and oriented in a direction opposite to the flange.

3. A radial-axial bearing assembly of claim 1 wherein the inner ring and the first bearing washer are made integrally with each other.

4. A radial-axial bearing assembly of claim 1 wherein the second bearing washer has a region projecting radially outwardly beyond the outer ring and said projecting region comprises bores for fixing the bearing assembly on a connecting structure.

5. A radial-axial bearing assembly of claim 1 wherein at least a part of an outer peripheral surface of the outer ring is configured as a cylindrical centering surface for concentrically guiding the bearing assembly in a corresponding bore of a connecting structure.

6. A radial-axial bearing assembly of claim 1 wherein at least one seal is arranged between the outer and the inner ring of the radial cylinder roller bearing.

7. A radial-axial bearing assembly of claim 1 wherein the outer ring comprises an axial lubricant supply bore which communicates with a radial lubricant supply bore.

8. A radial-axial bearing assembly of claim 1 wherein the second bearing washer comprises an axial lubricant supply bore which communicates with a radial lubricant supply bore.

9. A radial-axial bearing assembly of claim 1 wherein the outer ring comprises at least one radial lubricant discharge bore which communicates with an axial lubricant discharge bore.

10. A radial-axial bearing assembly of claim 1 used to mount a master cylinder of a printing press.

* * * * *